(12) United States Patent
Gunderson

(10) Patent No.: US 8,093,869 B1
(45) Date of Patent: Jan. 10, 2012

(54) APPARATUS FOR GENERATING ELECTRICITY UTILIZING NONDESTRUCTIVE INTERFERENCE OF ENERGY

(75) Inventor: Graham A Gunderson, Spokane, WA (US)

(73) Assignee: Chava Energy LLC, Coral Gables, FL (US)

( * ) Notice: Subject to any disclaimer, the term of this patent is extended or adjusted under 35 U.S.C. 154(b) by 269 days.

(21) Appl. No.: 12/327,719

(22) Filed: Dec. 3, 2008

Related U.S. Application Data

(60) Provisional application No. 60/992,009, filed on Dec. 3, 2007.

(51) Int. Cl.
*B06B 1/02* (2006.01)
*B06B 1/06* (2006.01)
*H01L 41/00* (2006.01)
*H02K 35/00* (2006.01)

(52) U.S. Cl. .............. 322/3; 310/26; 310/328; 310/311; 367/157; 367/168

(58) Field of Classification Search .............. 310/26, 310/311, 328, 323.01; 322/3; 367/153, 168
See application file for complete search history.

(56) References Cited

U.S. PATENT DOCUMENTS

| | | | | |
|---|---|---|---|---|
| 2,044,807 A | * | 6/1936 | Noyes, Jr. | 367/153 |
| 2,101,272 A | * | 12/1937 | Scott | 333/189 |
| 2,404,764 A | * | 7/1946 | Hayes | 367/163 |
| 2,683,856 A | * | 7/1954 | Kornei | 322/2 R |
| 2,930,912 A | * | 3/1960 | Miller | 310/26 |
| 2,945,192 A | * | 7/1960 | Szymanski | 332/139 |
| 3,070,790 A | * | 12/1962 | Roth | 340/388.1 |
| 4,327,246 A | * | 4/1982 | Kincaid | 174/36 |
| 4,443,731 A | * | 4/1984 | Butler et al. | 310/334 |
| 4,769,599 A | * | 9/1988 | Mermelstein | 324/244 |
| 5,047,683 A | * | 9/1991 | Butler et al. | 310/334 |
| 5,568,005 A | * | 10/1996 | Davidson | 310/328 |

* cited by examiner

*Primary Examiner* — Burton Mullins
(74) *Attorney, Agent, or Firm* — Gary Hoenig

(57) ABSTRACT

A ferromagnetic material having non-zero magnetoelasticity, and/or nonzero magnetostriction is driven with vibratory mechanical energy at a frequency producing at least one resonant vibratory mode, by coupling a source of vibratory energy to the ferromagnetic structure. The ferromagnetic material threads at least one conductive wire or wire coil, and couples to at least one source of magnetic induction, and provides an electrical power output driven by the magnetic induction. The origin of vibratory energy and the site or sites of magnetic induction are situated at distinct locations, separated by a specific distance not less than ⅛ the fundamental acoustic wavelength. Various combinations of acoustic wavelength, ferromagnetic material type, and source of vibration produce independent transfer coefficients between acoustic and electromagnetic energy which are either positive, zero, or negative.

18 Claims, 8 Drawing Sheets

APPARATUS FOR GENERATING ELECTRICITY UTILIZING NONDESTRUCTIVE INTERFERENCE OF ENERGY

FIELD OF THE INVENTION

The present invention is directed to a method and device for generating and transferring electrical power using solid-state acoustic, or vibratory, means.

BACKGROUND OF THE INVENTION

Magnetoelasticity is defined as the sensitivity of a ferromagnetic material's magnetic characteristics to mechanical stress. Stress exerted on the ferromagnetic material produces a corresponding mechanical strain within the material. A ferromagnetic material having nonzero magnetoelastic coefficient is herein referred to as a magnetoelastic material. When a magnetoelastic material is subjected to alternating mechanical pressures, an alternation of its magnetic properties is correspondingly produced. When a magnetoelastic material subject to mechanical stress carries nonzero magnetic flux, the magnetic flux correspondingly changes with pressure applied to the ferromagnetic material. A changing magnetic flux is able to induce electrical signals and power by the mechanism of electromagnetic induction.

Magnetostriction is defined as a ferromagnetic material's ability to produce mechanical stress and strain causing changes in shape or volume, in a manner that corresponds to the magnetic polarization of the ferromagnetic material. A ferromagnetic material having non-zero magnetostriction is herein referred to as a magnetostrictive material. When a magnetostrictive material carries alternating magnetic flux, its internal stresses and physical dimensions vary corresponding to the magnetic field. All ferromagnetic materials have some degree of magnetostriction, and some degree of magnetoelasticity.

Vibration or alternating pressure within a medium is acoustic energy. Magnetoelastic materials are able to convert acoustic energy into magnetic energy. Conversely, magnetostrictive materials are able to convert magnetic energy into acoustic energy. Electromagnetic induction is able to exchange electrical energy with magnetic energy. The combination of electromagnetic induction, and magnetostriction and/or magnetoelasticity, provides a bridge between electrical and acoustic energy.

Ferromagnetic materials are often both magnetoelastic and magnetostrictive. However, some magnetic materials exhibit magnetostriction and magnetoelasticity which are not equal in magnitude.

Ferro-magnetic materials consist of magnetic dipoles which can be polarized magnetically. A complimentary class of ferro-electric materials consists of electric dipoles which can be polarized electrically. Piezoelectric materials contain ferroelectric dipoles capable of permanent polarization. Piezoelectric materials are generally well known as materials able to convert electrical energy to acoustic energy.

DESCRIPTION OF THE RELATED ART

A small body of prior art exists exploiting the above relationships between material types. Due to the complimentary properties of electric charge and magnetic flux, physical vibratory interaction between magnetostrictive materials and electrostrictive or piezoelectric materials produces likewise complimentary energy relationships which presently are regarded as novel. Among the well-known family of reactive electrical components such as inductors, capacitors and transformers, a lesser-known component called the gyrator is produced by mechanically interfacing magnetostrictive and piezoelectric materials within the same component. Energy exchange between the magnetostrictive and piezoelectric materials produces a circuit component with unique properties among the more familiar reactive components, as detailed in the teachings of Viehland et al, US 2006/0279171, as a representative example of the art. Hybrid energy converters bearing similarity to magnetic or piezoelectric transformers are constructed by similar means, as illustrated again by Viehland et al, US 2005/0194863.

Several prior art devices exist which incorporate magnetostrictive and piezoelectric materials in intimate, physically coupled contact such that vibration of one material translates to vibration of the other; thus of their assembly as a whole. However, the immediate, co-located physical contact between different materials in these devices demands both vibrate and respond as a single entity, where the timing of the vibrations in each material are generally simultaneous. The present invention represents a novel departure from this approach.

SUMMARY OF THE INVENTION

Accordingly, the present invention is directed to a method and device for generating and transferring electrical power using a acoustic or vibratory means, in combination with an electromagnetic coupling means, capable of providing highly efficient energy transfer, thereby substantially obviating one or more of the problems due to the limitations and disadvantages of the related art.

The present invention is a energy generating apparatus essentially comprising an energy transfer and multiplier element being constructed of a ferromagnetic substance possessing magnetostrictive characteristics, magnetoelastic characteristics, or both; and having a natural resonance, due to a physical structure whose dimensions are directly proportional to the wavelength of the resonance frequency, an electromagnetic coupling element comprising a winding of at least one turn of conductive wire encircling the energy transfer and multiplier element, a magnetic field induced along the linear dimension of the energy transfer and multiplier element, and a exciter means capable of inducing an acoustic wave within the energy transfer and multiplier element, such as a piezoelectric device or linear motor. When energized by the exciter element, a current is generated in the coupling element.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings.

DETAILED DESCRIPTION OF THE INVENTION

Figure 1:
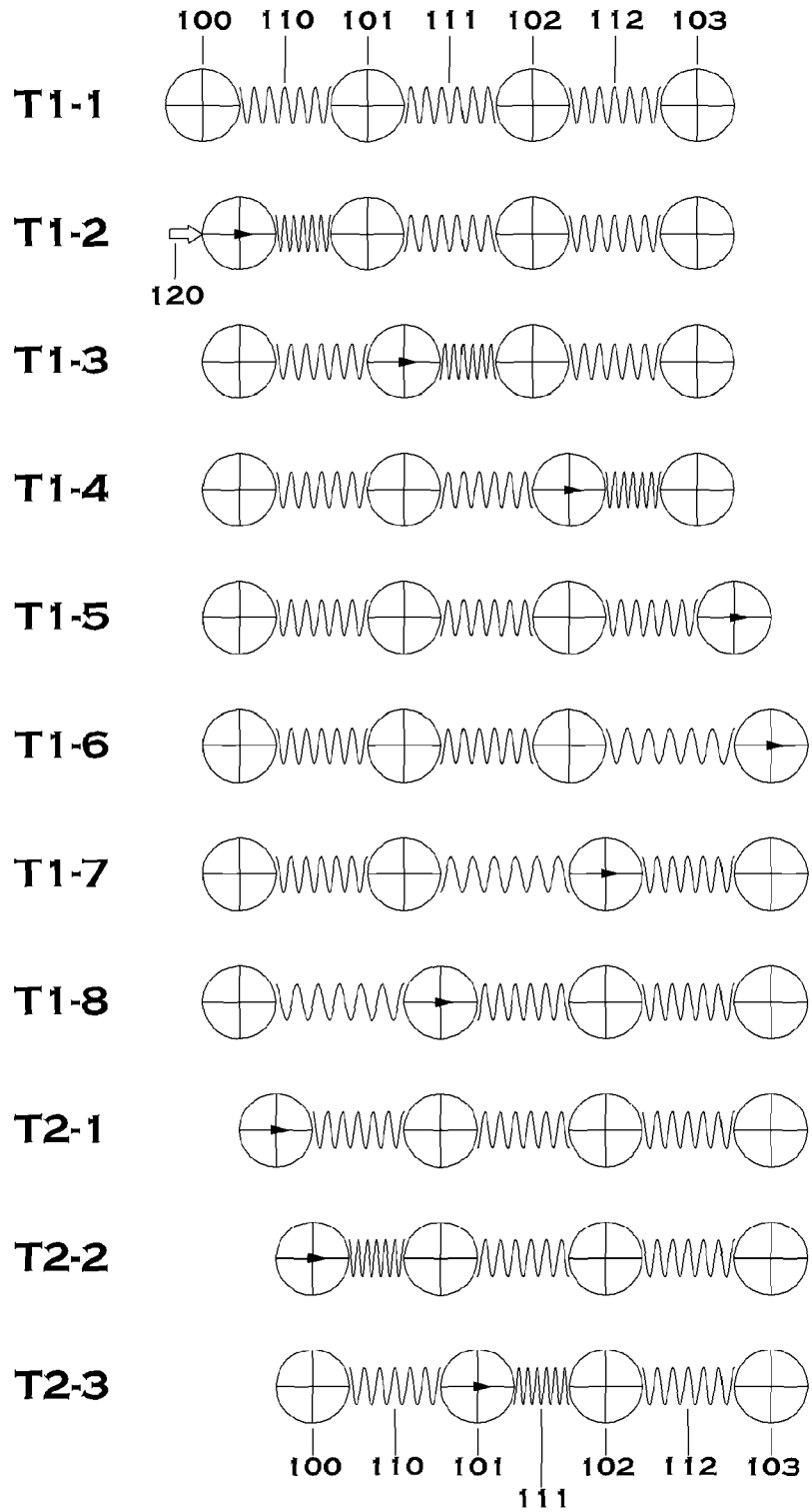
FIG. 1 illustrates propagation of mechanical wave energy between atoms constituting an elastic solid, such as the ferromagnetic material utilized in the present invention.

Description of the Physics of the Invention:

Vibratory energy, as acoustic energy within a solid material, propagates at a speed that is generally unique to that material. Ferromagnetic solids have an acoustic velocity, or speed of sound, in the range of 5000 meters/second. Acoustic energy applied at a given point propagates outward very slowly, relative to electromagnetic energy such as light, whose speed in vacuum is standardized at 299,792,458 meters/second. Acoustic energy in ferromagnetic solids propagates at about 0.0016% the speed at which electromagnetic energy propagates in free space.

Owing to this relatively slow propagation velocity, acoustic waves traveling through solids experience substantial phase shifts over relatively small distances, relative to frequency. A 125 kHz acoustic wave propagating through a ferromagnetic solid having 5000 m/s acoustic velocity experiences a 90 degree phase shift over a distance of 1 cm. An electromagnetic wave of 125 kHz propagating through free space only achieves a 90 degree phase shift at a distance of 600 meters. Due to the substantial delays incurred by slow acoustic propagation velocity in ferromagnetic solids, a source of coherent acoustic wave energy in the sub-megahertz band may be exerting a compressive stress at a specific instant, while the acoustic pressure a few centimeters away is tensile, nil, or of intermediate value. Because acoustic waves can translate to electrical energy by the means disclosed herein, thereby determining the phase of the electrical waves, and because the phase of electrical waves determines the type and content of the electrical energy, acoustical phase-shifting produces electro-acoustic power transformations novel among prior art.

Magnetic materials including iron, nickel, silicon iron and other iron alloys, amorphous metal (such as Metglas, Metglas Inc., Conway, S.C.), nanocrystalline alloys (such as Finemet, Hitachi Metals Inc., Tokyo, Japan); magnetic ferrites (such as Re—Fe2O4 where Re=Mn, Zn, Co, Ni, Li; and Re—Fe12O19 where Re=La, Ba, Sr, Pb) and the mineral hematite (alpha-Fe2O3) exhibit magnetoelasticity. The magnetic properties of each material are, to various extents, dependent on stress applied to the material. Generally, compressive stress will decrease the magnetic susceptibility to polarization, and decrease the saturation magnetization, while increasing the coercive force of the material along the stress axis; while tensile stress produces the opposite changes, increasing the magnetic susceptibility and saturation magnetization, and decreasing the coercive force along the stress axis.

A cylindrical rod of solid material with an axial length greater than its diameter will support longitudinal acoustic resonance along its cylindrical axis. When an acoustic or vibratory impulse is applied at the proximate rod end, acoustic energy propagates down the rod axis at the acoustic velocity of the rod material. Upon reaching the distal end of the rod, the acoustic energy is reflected, retracing its course toward the proximate rod end. The round-trip duration of acoustic wave travel down the rod axis and back is the acoustic reflection period. The reciprocal of the acoustic reflection period is the rod's fundamental longitudinal acoustic resonant frequency. This frequency is defined mathematically as $$V/(2*L)=F$$

Where
V is the acoustic velocity of a material in meters/second,
L is the acoustic length of the material in meters; and,
F is the fundamental resonant frequency in Hertz.

The factor of 2 in the above formula accounts for the reflection of the acoustic wave, which travels distance L, reflects off the boundary at the end of length L, then retraces its path, traveling distance L a second time before returning to its point of origin, thus completing one resonant wave cycle.

In this resonant condition, the rod material functions as a tuned waveguide, or longitudinal resonator, for acoustic energy. When axial vibratory energy is applied to the rod at the rod's fundamental axial resonant frequency, or integer multiples of this resonant frequency, standing acoustic waves are produced along the rod axis. A standing longitudinal acoustic wave in a rod consists of neighboring regions of a) maximum axially reciprocating displacement of the rod material at the vibratory frequency, termed antinodes, and b) regions of axially-directed alternating stress within the rod material, also at the vibratory frequency, termed nodal points. At the rod's fundamental half-wave longitudinal resonant frequency, wave antinodes appear at the ends of the rod, while a nodal point is at the center of the rod.

Figure 2:
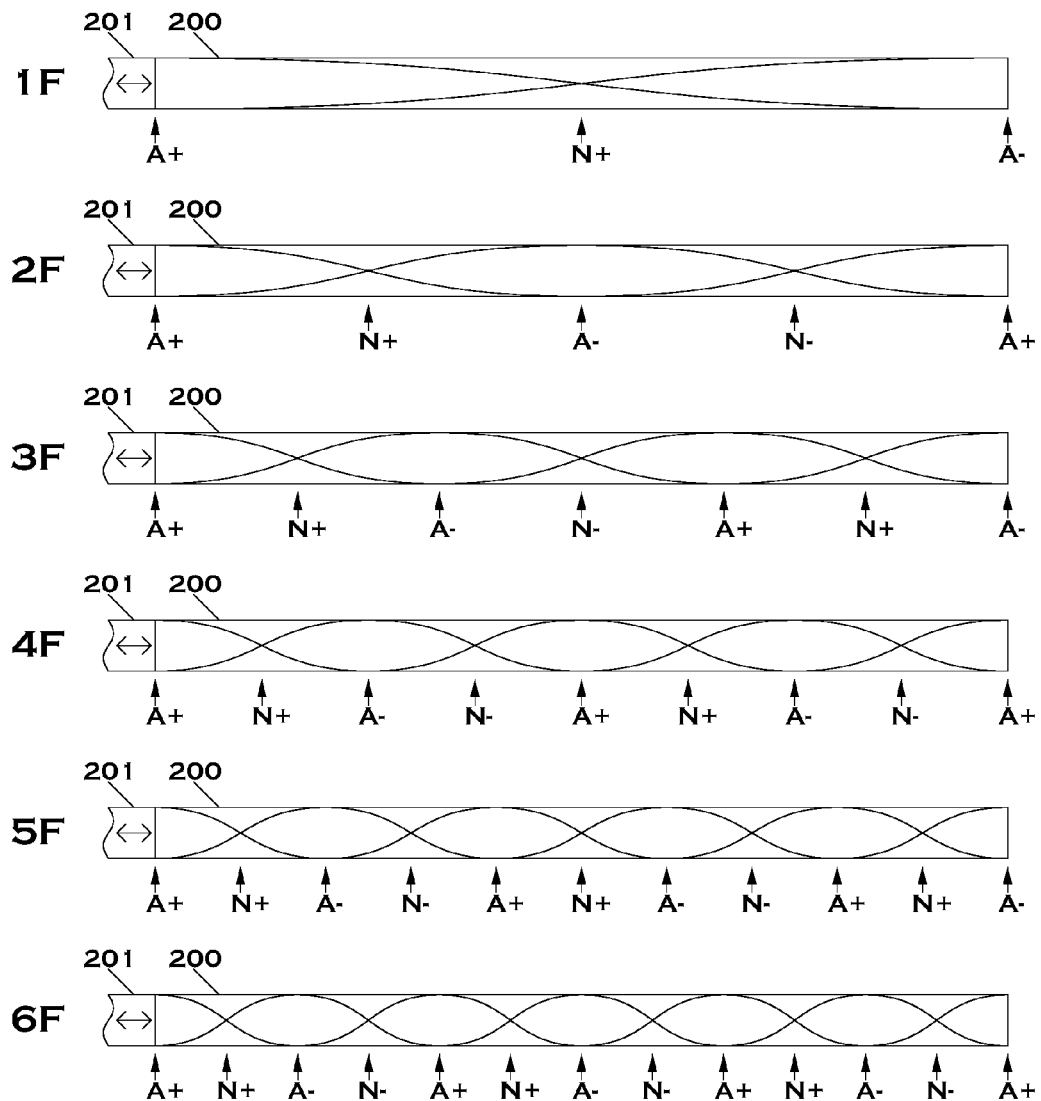
FIG. 2 is an illustration of the nodal and anti-nodal points in a linear section of resonating material in longitudinal resonance at successive harmonics.

When the rod is mechanically driven at frequencies which are integer multiples of this fundamental axial resonant frequency, the number of nodal points and antinodes increases, as illustrated in FIG. 2. Where more than one anti-node exists, each anti-node will exhibit axial displacement of direction opposite to the closest adjacent antinodes. Where more than one nodal point exists, each nodal point will contain axial stress that is opposite the sign of axial stress in the closest adjacent nodal points.

When a rod such as illustrated is formed of a solid, magnetoelastically active ferromagnetic material, the oscillating stress at the nodal point or points produces an oscillating change in the magnetic properties of the rod in the nodal regions, via the magnetoelastic activity of the rod material.

At least one permanent magnet, electromagnet, or other source of magnetic flux, termed "bias magnet", may be provided which magnetically biases the rod along its length, or portions of its length. The ferromagnetic rod becomes magnetically polarized along its axis, in response to the magnetic field applied to it by the bias magnet. Resonant longitudinal vibration along the rod axis produces at least one nodal point along this axis. The alternating stress at a nodal point produces a corresponding cyclic variation of the magnetic coercive force and magnetic susceptibility via the magnetoelastic effect. The periodically changing magnetic properties vary the degree of effective magnetic polarization within the rod, thereby producing a time-varying magnetic field. This time-varying magnetic field will induce electrical current by means well known in the art, most simply by winding a coil of conductive wire encircling the rod at its nodal point or points.

The time varying magnetic field induces an electromotive force, or EMF, in the electrical conductor, such as wire or wire coil, wound around the rod at or near the nodal point or points. When an electrical circuit including this wire coil is closed, electrical current will flow. This circuit may include an electrical load of any type, such that the device disclosed herein functions as an electrical generator, powering that load. At least three novel situations appear in this utilization, departing significantly from prior generator art, and which also depart significantly from the prior teachings in works utilizing energy exchange between magnetostrictive and piezoelectric materials, as typified in the related art listed above. These novel interactions further exemplify the novelty of the disclosed invention.

[A]: Lenz Field Addition. A changing magnetic field induces electrical current. Any current thus induced produces a secondary, induced magnetic field. This secondary magnetic field acts to oppose the first, causative magnetic field, such that the primary and secondary magnetic fields are of opposite sign, and exhibit opposing changes with respect to time. The secondary magnetic field will tend to cancel the primary magnetic field. This tendency is known as Lenz's Law, an electromagnetic rule governing induction of electrical currents by a changing magnetic field. In the disclosed invention, the changing magnetic field produced at a nodal point within a magnetoelastically active material induces electrical current in a coil of conductive wire wound around it; this coil of conductive wire then produces a secondary magnetic field due to passage of induced current within it, which tends to oppose the primary changing magnetic field produced magnetoelastically. This mutually opposing interaction limits the electrical power generated by a single nodal point.

Figure 6:
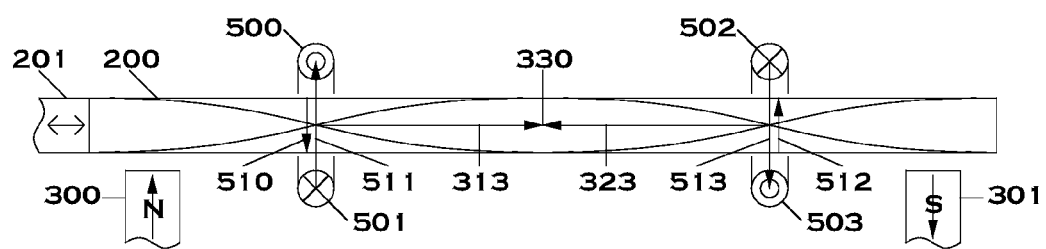
FIG. 6 shows mutual magnetic opposition between plural inductive take-off points, for purposes of increasing the energy-density of the present invention.

Harmonic resonance causes multiple nodal points to exist, as illustrated in FIG. 2. When more than one nodal point exists, each nodal point will contain mechanical stress of a sign opposite to stresses within the nearest adjacent nodal point or nodes. Since the mechanical stress in neighboring nodes is opposite, the magnetoelastic changes produced by the stresses are also opposite. Therefore the changing magnetic fields produced at the nodal points change oppositely to one another, and the current induced within individual wire coils wound around respectively individual nodal points is of mutually opposite sign. For example, a rod of magnetoelastic material acoustically excited at a frequency creating two nodal points will induce oppositely-directed currents in the two wire coils, one wound around each nodal point, as schematically depicted in FIG. 6.

Harmonic resonance produces a structural mechanism enforcing additional magnetic opposition among the oppositely directed currents flowing in neighboring co-located wire coils, apparent as additional magnetic opposition between the two or more wire coils neighboring each other along the same magnetic path. The further magnetic opposition between neighboring coils having opposing induced currents thereby adds to the total amount of magnetic opposition present at each nodal point and wire coil, and in the apparatus as a whole. Because electric power is generated via magnetic opposition, this additional magnetic opposition increases the total electrical energy delivered by each coil, hence the total electrical energy delivered by the device as a whole. In addition, the proximity of counter-flowing currents in neighboring coils tends to decrease the self-inductance of each wire coil, allowing greater amounts of electrical current to flow from the device and power an electrical load.

Since operation at different acoustic frequencies results in a different number of nodal points, the above situation may include, and benefit from practically any number of nodal points and related wire coils. The scope of this invention includes at least one "bias magnet" producing magnetic polarization of the magnetoelastically active ferromagnetic material undergoing acoustic vibration, but is not limited to a single bias magnet; numerous combinations of nodal structure, bias magnet structure, and magnetoelastic material structure exist, which will be exemplified by illustration below, but whose description is not intended to limit the number of combinations achievable within the scope of the invention.

[B]. Magnetostrictive Positive Feedback. In the present invention, acoustic waves produce time-varying mechanical stress in a magnetoelastic material which is magnetically polarized. A time-varying magnetic field is thus produced, which induces electric current in wire coils or other means of receiving an electromotive force, located near the nodal wave points within the ferromagnetic material. These induced currents produce opposing magnetic reaction, to which the ferromagnetic material is also exposed. Many magnetoelastic materials also exhibit magnetostrictive action, whereby a changing magnetic field is able to produce further stress, sourcing additional acoustic energy, in the ferromagnetic material in addition to the acoustic energy already present. In a ferromagnetic material having nonzero magnetostriction, the time-varying reaction magnetic field produced by induced current produces its own time-varying stress wave in the material, creating a second acoustic wave component proportional to the load current, and whose origin is nearest the wire coil carrying this current.

Thus the ferromagnetic material itself may be acoustically actuated by piezoelectric, electromagnet, or other means of vibratory activity, producing acoustic resonance in the ferromagnetic material; while the magnetic material itself may itself produce a second set of acoustic waves owing to its magnetostrictive action under the influence of induced current. The source of originating vibratory activity, such as a piezoelectric material, and the additional source of vibratory stress energy due to magnetostriction and induced current do not share an identical location. Typically, within the scope of this invention, these two sites will be separated by at least ⅛ of an acoustic wavelength, and more preferably ¼ of an acoustic wavelength.

Due to this physical separation, propagation of acoustic waves from both sources includes time delays which shift the phase of the acoustic energy. The extent of this propagation delay determines the relative phase angle of the acoustic energy at different points along the resonator structure considered as an acoustic transmission line. At some points, due to the wave delay and phase shift, the acoustic energy from all sources adds constructively, producing a net acoustic wave of greater intensity than any source considered alone. At other points the sum acoustic energy may be small and tend toward zero, where acoustic waves produce destructive interference. The locations where acoustic energy adds or annihilates depend on the resonator geometry, relative spacing between the sources of acoustic wave energy, the phase of magnetically induced current relative to the phase of incident acoustic waves, and fine frequency tuning of the applied vibratory or acoustic energy. Judicious adjustment of these factors causes acoustic energy to accumulate where it is most desired, for the purpose of generating electrical power.

Figure 5:
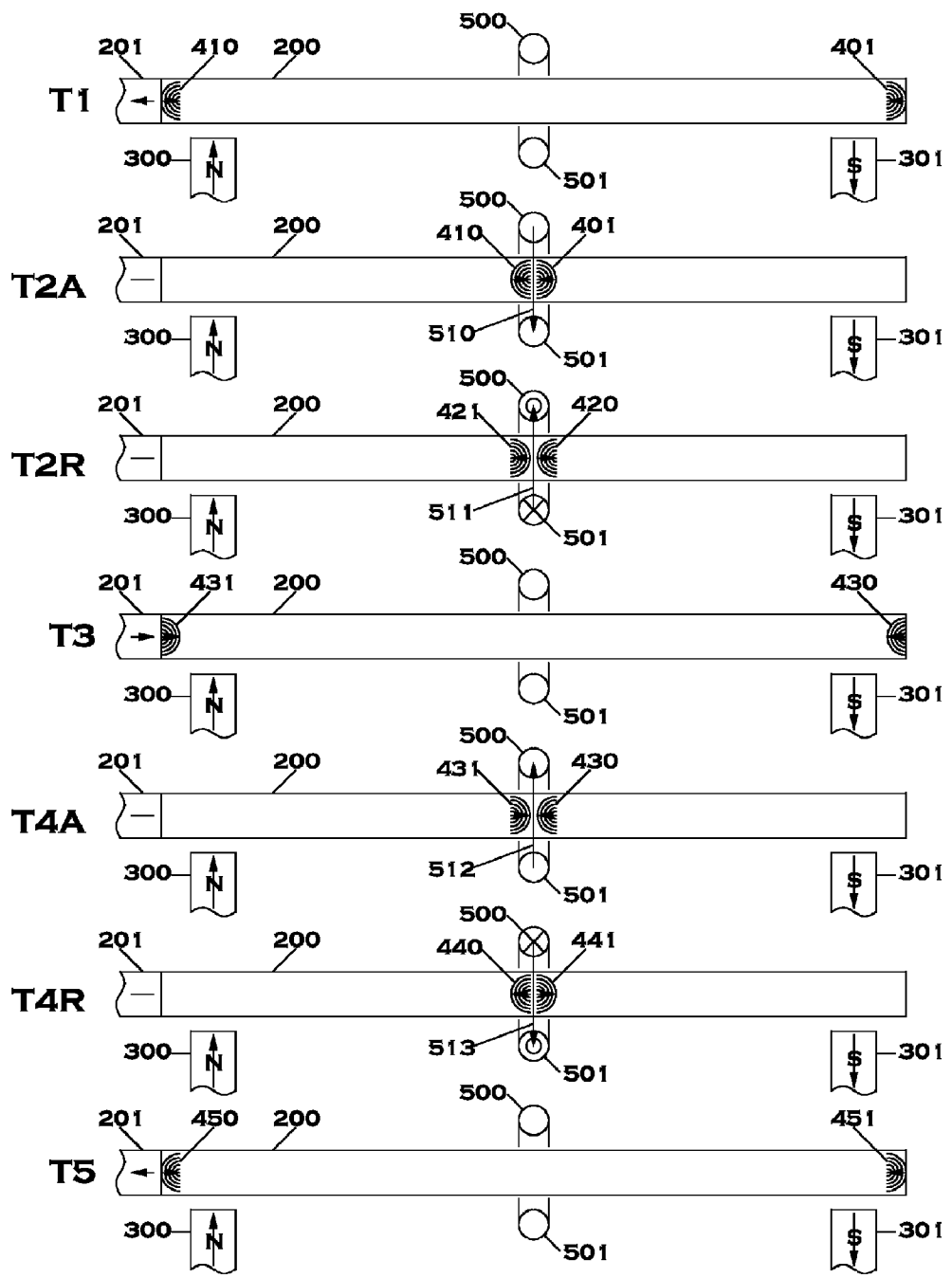
FIG. 5 is a diagram of nondestructive wave interference between acoustic energy and magnetostrictive force, as an extension of FIG. 4.

Constructive wave interference exemplary of this definition is illustrated in FIG. 5. A bar of ferromagnetic material is provided, having nonzero magnetoelastic and magnetostrictive activity. One end of this bar is provided with a source of vibratory energy, which in FIG. 5 is a wafer of piezoelectric ceramic. An alternating-current voltage signal is applied between the pole electrodes of the piezoelectric ceramic, at a frequency producing a fundamental standing wave within the ferromagnetic bar. Acoustic energy originates at the end of the bar to which the piezoelectric ceramic is attached, and which propagates outward along the bar axis away from the piezoelectric ceramic.

At resonance, a nodal point appears in the center of the ferromagnetic bar. A bias magnet structure is provided for magnetically polarizing the ferromagnetic bar, as well as a wire coil shown for purposes of inducing electrical power from the changing magnetic flux which results. When an electrical circuit containing this wire coil is closed, allowing electrical current to flow, the resulting reaction magnetic field acts magnetostrictively within the ferromagnetic bar, producing a secondary acoustic wave originating from the nodal point in the center of the bar. This secondary acoustic wave originating from magnetostrictive action propagates to both ends of the bar including the end with the piezoelectric ceramic attached.

The acoustic distance between the piezoelectric vibration source and the nodal point in the center of the ferromagnetic bar is approximately ¼ of an acoustic wavelength, at the fundamental resonance frequency of the bar. Therefore the phase of an acoustic wave traveling this distance is delayed by 90 degrees. The vibration source exerts a forward-thrusting acoustic wavefront which propagates along the axis of the bar. Upon reaching the nodal point the wave has been phase shifted 90 degrees with respect to the source due to propagation delay. The nodal point produces a time varying magnetic field by the means described above. This time varying magnetic field is opposed by the reaction magnetic field arising from induced current flowing in the wire coil; this magnetic opposition creates an additional 180 degree phase shift between action and reaction. The reaction magnetic field acts on the ferromagnetic bar's magnetostriction, producing a secondary source of acoustic energy originating from the coil's location at the nodal point, and propagating axially outward. The reaction wave which propagates back toward the vibration source must travel another ¼ acoustic wavelength, incurring an additional 90 degree phase delay, before returning to the site of the original vibration source and exerting its force.

When the sum of the above phase delays is taken, the total delay is 360 degrees, and is mathematically equivalent to zero degrees of total phase delay. Damping or opposition to the mechanical vibration would be approximated as a reaction wave shifted 180 degrees with respect to the source wave, or inverted with respect to the source wave, thus opposing the source and destructively interfering with the source. Since the total phase delay of the reaction wave in this example is 360 or 0 degrees of phase, destructive interference is replaced by constructive interference. Thus the piezoelectric ceramic, illustrated here as the originating source for mechanical vibration, experiences secondary mechanical reaction forces augmenting its own forces, rather than opposing these forces, when induced current is allowed to flow through the nodal-point wire coil of FIG. 5 in a closed circuit.

[C]: Harmonic Addition: The representative piezoelectric ceramic wafer of FIG. 5 may be provided with harmonic energy, or connected to a source of time-varying voltage which includes a harmonic series. An electrical "square wave", commonly known in the art, may be applied to the piezoelectric ceramic, thereby applying harmonic energy to the piezoelectric ceramic with a Fourier frequency spectrum including a fundamental frequency, plus odd-order higher harmonics of decreasing amplitude that are phase-locked to its fundamental frequency. The mechanical oscillation of the ferromagnetic bar will thus be a superposition of the odd-numbered states illustrated in FIG. 2, present simultaneously, and by various degrees, as determined by the relative intensity of the odd-order harmonic series present in the square wave signal electrically applied.

In this condition, the ferromagnetic bar will exhibit a multiplicity of nodal points, each with a specific amplitude and harmonic content. Major nodal points also exist, which include energy at all harmonics including the fundamental. FIG. 2 illustrates how, in this condition, the nodal point in the center of the ferromagnetic bar will become a major nodal point, since this central node is common to all odd-numbered harmonic vibratory modes.

Therefore, current induced in a wire coil placed around this central major node will include energy at several frequencies, which are summed into a single current wave rich in harmonic energy. At a particular frequency of the applied wave, the nodal point for each harmonic mode physically overlaps the others exactly, and their instantaneous amplitudes add together, producing a peak current in the wire coil in significant excess of the average current. Electrical power may be given as $$P = I^2 * R$$

Where
P is power, in Watts,
I is current, in Amperes; and,
R is resistance, in Ohms.

The high-amplitude peaks in the current developed under harmonic excitation produce electrical power as the square of their instantaneous value. The instantaneous electrical power developed in this manner is the square of the sum of the energy induced by each acoustic frequency.

The above three functions are exemplary as novelties of the invention disclosed herein. It will be understood these conditions arise due to magnetoelastic induction in a ferromagnetic material whose physical shape, including rods, is generally amenable to mechanical resonance; wherein the location of the source of vibratory energy initiating that resonance, and the locations where reduction of that resonance to electrical energy occur, are physically separated by a specific and non-zero fraction of the fundamental acoustic wavelength not less than ⅛ of the acoustic wavelength.

Such novel conditions tend to arise regardless of the ferromagnetic resonator's physical configuration, the exact material type of the resonator, or the particular technology utilized in generation of the originating vibratory energy. Examples of sources of originating vibratory energy include, but are not limited to, piezoelectric materials or electrostrictive materials, including their utilization within Langevin-style bolted transducers; electrostatic actuators, magnetostrictive materials, percussive combustion, rotary vibration induced by cams, pendulums, rotary hammers, or eccentric weights; vibrating strings or membranes, or electromagnetic actuators including linear motors, buzzers, or vibrators incorporating any of the following: inductive wire coils, permanent magnets, and ferromagnetic materials including magnetostrictive materials.

A related field known as power harvesting incorporates magnetostrictive and/or magnetoelastic materials and physical vibrations with the object of reducing ambient, often byproduct, vibrations to electrical energy. Power harvesting techniques are typically utilized aboard moving vehicles or engines, or in micro-power applications within personal or structural devices. The present invention differs significantly from the class of power harvesting devices, recognizing the following distinctions.

1) Power harvesting generators utilize ambient mechanical vibrations of arbitrary frequency; either utilizing such variegated, ambient or random vibratory energy in bulk, or by using it to drive an internal resonance at a particular frequency; the source of vibratory energy is often of unknown or non-specific frequency or amplitude, and is located external to the device. The present invention locates the source of vibratory energy within the device as an integral facet of its structure, with the aim of securing coherent mechanical resonance within the source of acoustic vibration and within the ferromagnetic material to be vibrated. In the present invention, ambient vibrations of external origin are not utilized, and the device has no connection to its external environment for physically conveying such vibration.

2) Power harvesting techniques incorporate a free weight, back-weight, or other moving mass in conjunction with the active ferromagnetic material such that vibratory energy is passed from an external source and through the active material, en route to disturb the inertia of the moving mass and thereby induce mechanical stress within the intervening ferromagnetic material utilized as a generator. In the present invention, vibratory mechanical energy resonates within the elasticity and the inertia of the active ferromagnetic material itself; no free weights are present.

3) Power harvesting devices typically utilize mechanical vibrations in the low-audible, or sub-audible, frequency range between about 10 Hz and 1,000 Hz; the typical target frequencies of interest fall within 20 Hz-200 Hz. Typical sources of vibration include engine noise, or the periodic motion of shoes, wristwatches or pocket devices. The present invention utilizes a frequency range that is generally above 1,000 Hz, with most preferred embodiments establishing mechanical resonance at frequencies of 5,000 Hz and above, up to acoustic frequencies of 5 MHz and beyond. An exception may be made for very large devices, of acoustic length sufficient to establish fundamental resonance at international power frequencies of 50 or 60 Hz. Regardless of preferred operating frequency, the aforementioned distinctions establish a clear boundary between the novel aspects of this invention including its own vibratory source, and the prior art harvesting mechanical power from external, ambient vibrations.

4) Power harvesting depends on ambient vibrations over which the power harvesting generator has no control. A power harvesting generator does not actively control the frequency, the amplitude, or the presence or absence of incoming vibrations, and is subject to them as a passive entity. The present invention typically includes self-contained means of controlling the amplitude, wave-shape, phase and frequency of its vibratory source, via a feedback circuit, microprocessor control, or via self-resonance between the magnetoelastic induction and the originating vibratory energy source connected by a mutual circuit. The present invention does not present a passive load to externally occurring vibrations, but generates acoustic energy internally, intended for internal use, by preferably incorporating a self-contained mechanism of controlling and/or modulating its internal vibratory source.

Because the present invention utilizes a definite and specific frequency, or harmonically related set of frequencies, its physical structure may necessitate acoustic waveguide sections, acoustic horns or focusing devices, acoustic tuning stubs, or acoustic-impedance matching networks required to efficiently sustain acoustic resonance. These elements of design are acoustic sections dimensioned to specific acoustic lengths, generally as integer multiples of ¼ the acoustic wavelength of the fundamental acoustic wave or its higher harmonics. Such acoustic sections produce acoustical impedance matching between the vibratory source and ferromagnetic material within the device. These impedance matching sections are the acoustic equivalents of electromagnetic impedance matching networks common to the arts of electrical power transmission, radio wave antennas, and radio transmitters and receivers.

DETAILS OF THE INVENTION

FIG. 1 is a schematic illustration of the process of wave propagation in elastic media. Since no physical material is infinitely rigid, all physical materials are to some degree elastic, or deformable under stress. The relationship between applied stress and resulting deformation or strain may be modeled by a lattice of masses connected by elastic springs. Both inertial and elastic restoring forces act upon each mass and connecting elastic spring. When stress and strain vary with time, acoustic wavefronts propagate through the elastic mass as illustrated by this model, wherein the vibration or oscillatory motion of the masses represents the acoustic wave.

A mass on a spring has a single resonant frequency determined by its spring constant K and its mass M. The spring constant is the restoring force of a spring per unit of length. Within the elastic limit of any material, there is a linear relationship between the displacement of a mass and the force attempting to restore the mass to its equilibrium position. This linear dependency is described by Hooke's Law:

$$F=(-K)*X$$

Where:
F is the force,
K is the spring constant; and,
X is the amount of particle displacement.

Forces applied to a mass are equal to the magnitude of the mass, times the acceleration applied. From Newton's Second Law, $$F=M*A$$

Where:
F is the force,
M is the mass; and,
A is the acceleration.

The force F, as common to both equations above, represents the nature of the equilibrium between acceleration A and displacement X in an elastic material. With the applied and restoring forces F in the above formulae, taken as equal, $$M*A=(-K)*X$$

Where the displacement of the mass, on the left hand side of the equality, and the restoring force of the spring on the right hand side of the equality, are in opposition.

The mass M, and spring constant K, are constants for physical materials at a constant temperature. The acceleration A and resulting displacement X are the variable quantities describing the mechanical energy. From the above equation, these two variables A and X are directly proportional. The time for displacement of a mass and its return to a position of mechanical equilibrium are independent of applied force.

Mechanical energy in the form of acoustic waves propagates at different speeds in different materials. The mass of the atomic particles and the spring constants are specific to material composition and, to a lesser extent, by factors such as temperature. The mass of the particles is related to the density of the material, and the spring constant is related to the elastic constants of a material. The general relationship between the velocity of mechanical waves in a solid and its density and elastic constants is given by the following equation:

$$V=\mathrm{sqrt}(C/P)$$

Where:
V is the velocity of longitudinal mechanical waves in the material,
C is the elastic constant for longitudinal stress,
P is the material density, and
sqrt denotes a square root function.

In the representative physical model of FIG. 1, circular objects 100, 101, 102, 103, represent solid masses having negligible elasticity and significant inertia. Elastic springs 110, 111, 112 signify the coupling between masses, having the complimentary properties of negligible inertia, and significant elasticity. The masses are taken to represent atomic nucleus masses or other inertially significant units, such as molecules, in a physical substance. The elastic springs are taken as the electronic or atomic-level bonds between these inertial masses. For solids, these elastic bonds are atomic electron shell bonds such as covalent bonds.

Labels T1-1, at top, through T2-3, at bottom represent progressive instants of time during which the ongoing state of longitudinal wave propagation is analyzed. At time T1-1, the system of masses and their elastic connections is at rest, where non-equilibrium mechanical energy is not present in kinetic, or potential, form.

At instant T1-2, an accelerating force 120 is applied to mass 100 causing longitudinal displacement and acceleration of the mass 100, as indicated by the rightward diagram arrow within mass 100. Accelerating force 120 thereby places the system of FIG. 1 in a non-equilibrium state. The resulting displacement of mass 100 elastically compresses spring 110, causing it to contract as illustrated. At this instant T1-2, laterally adjacent mass 101 has not moved, owing to its inertia. The kinetic energy of acceleration 120 is converted first to kinetic energy of mass 100, and subsequently into potential energy as elastic compression in spring 110. The complete transfer of kinetic energy of mass 100 to potential energy in elastic spring 110 causes mass 100 to come to rest, after accelerating force 120 is withdrawn. At this time, the kinetic energy of acceleration 120 has been stored as potential energy, or tension, in elastic spring 110.

At the time where the potential energy of tension in spring 110 reaches a maximum, the kinetic energy of mass 100 approaches zero, or rest, while the kinetic energy of rightward adjacent mass 101 begins its rise from zero, into motion.

At subsequent instant T1-3, the potential energy of compression in spring 110 is converted back to kinetic energy of acceleration of the next mass 101, causing rising acceleration of mass 101 as previous mass 100 approaches a state of rest. The kinetic energy of mass 100 has been transferred to the kinetic energy of next mass 101, through connecting elastic spring 110. The transfer of kinetic energy between adjacent masses has required conversion of this kinetic energy into potential energy and back again, a process which occurs over a finite period of time, or a delay between the displacements of mass 100 and 101. This delay in the transfer of kinetic energy between adjacent masses is commonly known as the acoustic velocity, or speed of sound, in the material, as illustrated by the equations above.

At subsequent instant T1-3, the above process repeats at a new location, between mass 101 (containing rightward diagram arrow indicating its state of motion) coming to rest by progressively compressing elastic spring 111, whose ensuing relaxation initiates acceleration of mass 102.

Subsequent instant T1-4 repeats this process further, now between mass 102, elastic spring 112, and into final mass 103.

Subsequent instant T1-5 illustrates the limit of longitudinal acoustic wave propagation in the right-hand direction of FIG. 1. At this time, the kinetic accelerating force originally applied to first mass 100 at time T1-2 has propagated to final mass 103, indicated by the rightward diagram arrow within mass 103. At this instant, the state of the model is similar to the initial state T1-1, with the exceptions of mass 103 retaining kinetic energy, and transposition of the model, assumed to be free in space, to the right due to the initial rightward acceleration 120 having propagated through the model. Without any further elastic spring to the right, mass 103 continues in rightward motion.

Instant T1-6 illustrates the continuation of rightward longitudinal displacement of final rightward mass 103. This continued motion ultimately expands elastic spring 112, causing a conversion of kinetic energy from mass 103 into potential energy in the form of tension within elastic spring 112.

In the preceding instants T1-2 through T1-4 the potential energy within elastic springs in the propagation model was compressive, while the direction of wave propagation was to the right hand side. In subsequent instants T1-6 through T1-8, the potential energy within successive elastic springs in the propagation model is tensile, while the direction of wave return, or reflection, is toward the left hand side of FIG. 1. The sign of the potential energy sequentially stored in elastic springs 112, 111, 110, and the direction of mechanical wave propagation resulting from sequential restoration of kinetic energy of masses 103, 102, 101, 100, have each reversed. The transfer between kinetic energy of the masses and potential energy in the elastic springs is identical to the process described above, with the vector of wave propagation and the sign of elastic potential energy now being opposite.

Instant T1-7 illustrates the reflective propagation due to the restoration of tensile potential energy stored in elastic spring 112, into acceleration of mass 102. The kinetic energy of rightmost mass 103 has been absorbed by elastic spring 112 and transferred to kinetic energy on mass 102 via elastic spring 112.

Instant T1-8 illustrates propagation of the above sequence to interaction between mass 101, converting its kinetic energy to potential energy of tension in spring 110, whose relaxation will initiate acceleration of leftward mass 100.

Instant T2-1 depicts the acceleration of mass 100 due to relaxation of tensile force in spring 110. At this instant, the state of the model is once again similar to the initial state T1-1, this time with the exceptions of mass 100 retaining kinetic energy, and further transposition of the model, assumed to be free in space, to the right due to the initially applied rightward acceleration 120 having continued to propagate throughout the model. Without any further elastic spring to the left, mass 100 continues in rightward motion.

Instant T2-2 illustrates the continuation of rightward longitudinal displacement of the leftmost mass 100, ultimately compressing elastic spring 110. At this instant T2-2, the action in the model is completely identical to the originating instant T1-2, with the single exception that the initial kinetic acceleration 120 has never been dissipated or relieved, and reappears in the model as if applied for a second time. The initial energy of acceleration 102 has been propagated by the model, and continues to propagate as the above processes indefinitely repeat. Since this model is assumed to act in free space, the net action is an inchworm motion successively toward the right. Final absorption of the original kinetic energy 120 requires intervention beyond the scope of this model.

In actual mechanical resonators to be described below, the above action occurs between atoms constituting the resonator material and the elastic electron-shell bonds between these atoms. These physical resonators are assumed fixed in space, being supported by means attaching them to some fixed reference frame, such as an enclosure within an electronic device. The accelerating force 120 is a periodocally alternating force, both rightward and leftward; thus net motion of the resonator in any direction is restrained and in balance. The above process of propagation and reflection, with the reversal in sign of the forces in springs between compressive and tensile, remain as illustrated.

It should be noted that the states T1-2 and T2-2 are effectively identical, but separated in time by a specific interval. Intermediary states (denoted by the number after the hyphen, such as -2, etc) cumulate as full propagation cycles as denoted by the transition of the major number, such as T1-T2. The cycle time between states T1-T2, which can likewise be stated as the cycle time between matching states T1-2 and T2-2, T1-3 and T2-3 etc., is the time per full cycle of the resonating structure. The reciprocal of this amount defines the resonant frequency at which this repetition occurs:

$$F = 1/P$$

Where:
F is frequency, in Hertz or cycles-per-second, and
P is the period, in seconds per cycle.

The velocity of mechanical wave propagation in the figurative material may be defined equivalently to its first definition by dividing twice the mean length of the material, by the cycle repetition period. From FIG. 1, the mean length of the material is the length at rest illustrated by T1-1:

$$V = (2*L)/P$$

Where:
V is the velocity of longitudinal mechanical waves in the model or material, in meters per second;
P is the cycle period, in seconds per full cycle,
L is the mean length of the model or physical material in which the mechanical wave propagates, in meters; and,
the factor of 2 represents the total propagation of the wave during a full cycle, along length L and returning back along same length L a second time to restore its initial state, thereby completing a full cycle.

Figure 4:
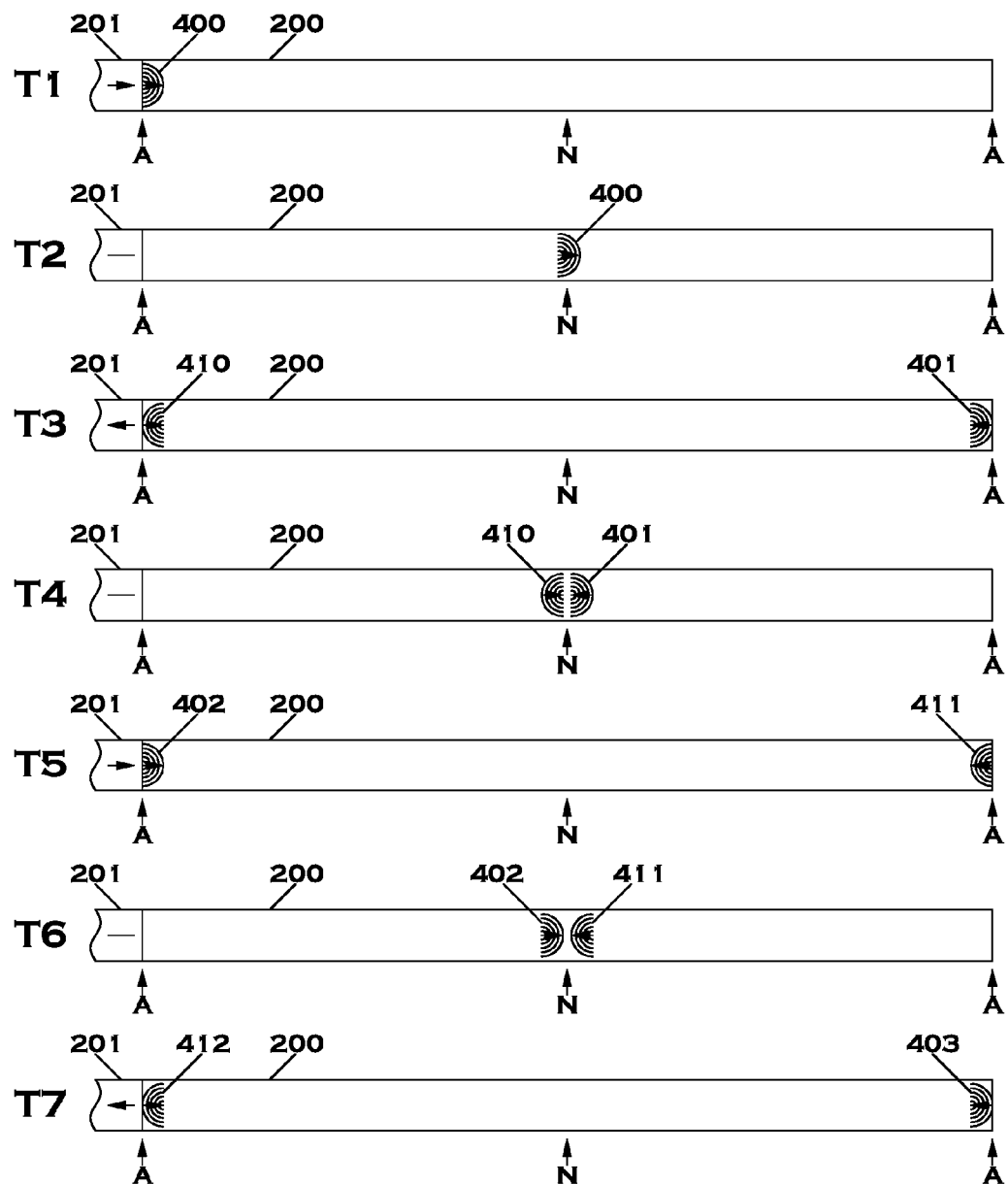
FIG. 4 is a depiction of acoustic energy reflection and interference at fundamental longitudinal resonance.

FIG. 2 depicts the results of resonant mechanical wave interference in macroscopic samples of elastic material driven into longitudinal resonance at successive integer harmonic frequencies. It may be noted, from examining FIG. 1 that the length of the model as a whole elongates and contracts at rhythmic intervals related to the resonant frequency. FIG. 1 illustrates this behavior in response to a single acceleration event 120. Under repetitive acceleration, or application of force 120 in alternating longitudinal directions at an interval identical to the cycle time, driven resonance is established which rhythmically expands and contracts the model, or the elastic material. FIG. 4 depicts the relevant wave mechanics in expanded detail, in preparation for description of a fundamental novelty of the disclosed invention.

In FIG. 2, a physical elastic material 200 undergoing resonant longitudinal expansion and contraction is driven into mechanical resonance by a repetitive alternating longitudinal force, illustrated as physical acceleration source 201. Acceleration source 201 may be any source of rhythmically alternating kinetic acceleration, including an electromagnetic motor, piezoelectric element, or incident pressure wave.

The resonant frequency of elastic material 200 may be determined by its mechanical wave velocity (or acoustic velocity) divided by twice the physical length:

$$F = V/(2*L)$$

Where:
F is the fundamental resonant frequency in Hertz or cycles-per-second,
V is the acoustic velocity of the resonator material, in meters per second,
L is the physical length of the resonator material, in meters; and,
the factor of 2 represents the completion of a full resonant cycle by wave propagation along length L, and subsequent reflection along length L retuning to the initial state.

This defines the fundamental resonant frequency of the structure. Since the full acoustic wave must travel along length L twice in a full cycle, physical resonator length L may be taken as equal to half of the acoustic wavelength. Therefore, the structure of a standing acoustic wave in the resonating material at this fundamental frequency takes the form one half of an acoustic wave.

A longitudinally propagating acoustic wave, as depicted in FIG. 1 consists of two distinct components: firstly the longitudinal displacement of material and secondly the longitudinal elastic stress among the material's interatomic forces. The cyclic repetition of a resonant acoustic wave creates cyclical displacements and cyclical elastic stresses, both of which oscillate or vary at finite amplitude between positive and negative signs, at the frequency of oscillation. Since a single frequency without harmonic overtones is a sinusoidal wave, the above illustrated cyclical oscillations of longitudinal displacement and elastic stress are taken to alternate sinusoidally.

The acoustic wave in the resonator structure produces maxima of either quantity, located one quarter wavelength apart. An identical phenomenon is well known for electromagnetic waves within resonators and waveguides, wherein the maxima of electric and magnetic fields are located one quarter wavelength apart. Longitudinal acoustic waves in acoustic resonators obey the same generality, as a feature central to the disclosed invention.

In FIG. 2, condition 1F illustrates the structure of the standing wave at the fundamental resonant frequency, corresponding to one-half an acoustic wave distributed along the resonator length 200. Acceleration source 201 is, in this case, producing sinusoidally alternating physical acceleration at the fundamental resonant frequency of the resonator 200, as defined by the above equation.

In this condition, the acoustic wave structure along the resonator's length is one-half of a full wave, or two quarter-wavelengths. The maxima of longitudinal displacement and the maxima of longitudinal elastic stress are spaced one quarter wavelength apart. The maxima of longitudinal displacement, termed antinodes, are marked by diagram arrows at positions A. Maxima of longitudinal elastic stress, termed nodes or nodal points, are marked by diagram arrows at positions N. As illustrated in FIG. 1, the locations of peak displacement lay at the ends of the resonator model, placing the antinodes in FIG. 2: F1 at both ends of the resonator, and the nodal point of maximal elastic stress at the center of the resonator, one quarter wavelength from each end, at N.

In diagram F1, the two antinodal points are marked A+ and A−, respectively. Nodal point A+ indicates the longitudinal displacement is in-phase, or acting with, the sinusoidal acceleration introduced to the resonator by acceleration source 201. Nodal point A−, one half-wavelength distant, is 180 degrees out of phase, or opposite in sign with respect to the former. Being of oppositely signed longitudinal displacement, this more distant antinodal point is labeled A−. Since antinodal points A+ and A− signify opposing longitudinal displacement, the total instantaneous length of resonator 200 is oscillating, the resonator 200 becoming physically longer and shorter at fundamental resonant frequency F. This alternation of length produces alternating compression and tension in the material of resonator 200, whose maxima of elastic stress is any nodal point N. The single nodal point in diagram F1 is given the sign N+, signifying the convention that compressive (positive) elastic stress is taken as being in-phase with the phase of acceleration source 201, while a negative, tensile elastic stress, or N−, is 180 degrees out of phase with 201, having equal intensity while opposite in sign.

Since elastic stress N is the direct product of displacement A; stress N and displacement A are in phase, each quantity reaching maximal or zero values simultaneously. A+ is taken as longitudinal displacement in phase with the displacement of longitudinal acceleration source 201 while displacement A− is out of phase, or opposite in direction; stress N+ is taken as compressive elastic stress in phase with acceleration source 201 while opposite stress N− is an opposing tensile elastic stress, in phase with acceleration source 201, this condition being identical to compressive elastic stress that is 180 degrees out of phase with acceleration source 201.

As previously noted, the phenomenon of magnetoelasticity is the relationship between elastic stress in a ferromagnetic material and a change in the ferromagnetic material's magnetic properties, a useful feature for generating electrical power. Therefore, at nodal point N where the intensity of alternating elastic stress reaches a maximum, an alternation of ferromagnetic properties in resonator 200 has also reached a maximum, if resonator 200 is constructed of ferromagnetic material having nonzero magnetoelasticity. Therefore, a magnetic condition conducive for the magnetoelastic generation of electrical power is present at each nodal point N.

Resonator 200 will also support standing acoustic waves, producing longitudinal mechanical resonance, at harmonics or overtones of this fundamental frequency. Mathematically this is equivalent to multiplying frequency F in the above equation by integers greater than 1.

2F depicts the behavior of the identical resonator system, resonating at the second harmonic or resonant frequency F multiplied by 2 (2F). In this case a total of 4 quarter wavelengths are spaced along the length of resonator 200. The structure of the acoustic energy along the length of resonator 200 is a full acoustic wave. As previously described, the transit of this acoustic wave down the length of resonator 200 and reflecting back along this same length to source 201 occupies two full wave cycles, at the frequency 2F, producing a singe full wave along the length of resonator 200.

Antinodal points again exist at each end of resonator 200. A positive in-phase antinode is present at the location of acceleration source 201. One quarter-wavelength distant, a positive, or compressive-in-phase nodal point N+ is present. One further quarter wavelength along the length of resonator 200, an antinodal point of opposite sign A− is present, indicating an opposing longitudinal displacement occurs here. A further quarter wave distant from acceleration source 201, a negative or tensile-in-phase nodal point N− exists, followed by a final antinodal point A+ that is in-phase with acceleration source 201.

It may be noted that each antinodal point A takes a sign opposing its immediately neighboring antinodal points A, and each nodal point N is of a sign opposing its immediately neighboring nodal points N.

This situation is further repeated for integer harmonics 3F through 6F, inclusive. Each of these diagrams of FIG. 2 represent longitudinal acoustic resonance at the fundamental resonant frequency F multiplied by the number of the diagram. Diagram F6 depicts the acoustic wave structure for resonance at six times the fundamental frequency, or overtone 6F. This overtone, or harmonic frequency, can be any integer number. If the harmonic overtone is taken as variable X, harmonic resonance occurs at X times F. The number of antinodes for a straight longitudinal acoustic resonator is always X+1 while the number of nodal points is always X.

In diagram F6, six nodal points N exist with adjacently opposing polarities. At each successive nodal point N, magnetic conditions conducive for the magnetoelastic generation of electrical power exist. Since the polarities of elastic stresses N are opposite at each successive nodal point, the magnetoelastically induced changes in ferromagnetic properties are likewise opposite in sign at each successive nodal point N. The number of locations N which are conducive for magnetoelastic generation of electrical power is equal to the harmonic overtone number X, and increase as X increases.

In practice material characteristics set a limit to the maximum number of X, while theoretically there is no limit to the overtone at which resonance will occur.

Figure 3:
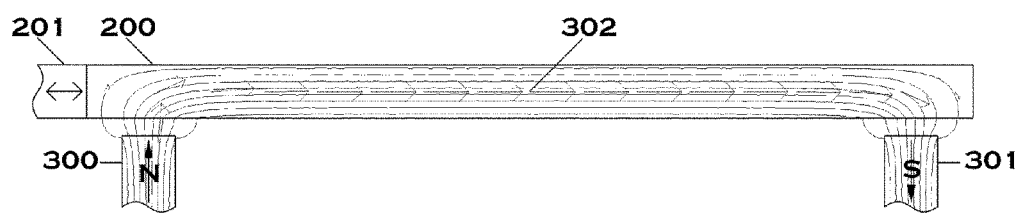
FIG. 3 is an example of magnetic flux distribution within the ferromagnetic material of the present invention.

FIG. 3 depicts the resonator structure shown in FIG. 2 with a magnetic bias applied. Acoustic resonator structure 200 is given as a ferromagnetic material, which can be magnetically polarized and is therefore able to conduct magnetic flux. Flux sources 300 and 301 illustrate pole pieces of an external magnet, or magnetic flux source, which may be a permanent magnet or electromagnet. Any such source of magnetic flux will produce at least one North magnetic pole, illustrated by North-polarized pole piece 300, and at least one South magnetic pole, illustrated by South-polarized pole piece 301. The material of pole pieces 300 and 301 may be a common ferromagnetic material such as iron, suitably connected to a permanent magnet or electromagnet, or a common permanent magnet material such as neodymium-iron-boron, Alnico, or a ceramic ferrite such as strontium ferrite, or ceramic ferrites well known in the art.

Magnetic flux emerging from the ends of pole pieces 300 and 301 enters the ferromagnetic material of acoustic resonator 200 and this flux is carried along the length of resonator 200 toward the pole of opposite polarity. By convention, magnetic flux is considered to travel from North to South poles, as indicated by the simple arrows following diagrammatic magnetic flux lines 302, indicating the flux and its course through resonator 200 made of a ferromagnetic material. It may be seen that, in such a condition, the magnetic polarization is substantially uniform along the length of resonator 200, particularly at its center.

If acceleration source 201 produces longitudinal acoustic resonance in resonator 200 as shown in FIG. 2: F1, resulting nodal point N+ will be situated at the center of resonator 200 where uniform magnetization now exists. Nodal point N+ will produce a time-varying elastic stress within the ferromagnetic material of acoustic resonator 200. If the ferromagnetic material of resonator 200 exhibits nonzero magnetoelasticity, the time-varying elastic stress N+ produces a time-varying alternation in the ferromagnetic properties of resonator 200. Resonator 200 is carrying a magnetic flux 302 along its length at the location of the acoustic node N+. This magnetic flux causes generally magnetic polarization of the ferromagnetic material of resonator 200. The specific degree of this polarization is dependent on the magnetic intensity of flux sources 300 and 301, as well as the instantaneous magnetic properties of ferromagnetic material 200, which now vary with time due to nonzero magnetoelasticity and time-varying elastic stress at nodal point N+.

Therefore, a time-varying magnetic flux will be present at nodal points N which may coexist in FIG. 3, due to the sinusoidally alternating acceleration of acceleration source

201. When the frequency of this acceleration at 201 is equal to an integer harmonic of the resonant acoustic frequency of resonator 200, as generally illustrated in FIG. 2, all resulting nodal points N produce a time-varying magnetic flux proportional to the product of the intensity and sign of bias flux 302, and the intensity and sign of elastic stress |N|. As is well known in the art of electrical generators, a time-varying magnetic flux is able to induce EMF and electric power, in electrical conductors suitably exposed to the time-varying magnetic flux. Typical electrical generators, well known in the art, produce such time-varying magnetic flux by moving flux sources, or pole pieces, such as 300 and 301 past electrical conductors suitably arranged. The present invention discloses means by which a time-varying magnetic flux is produced not by motion of magnetic sources or pole pieces, but instead by time-varying elastic stress within ferromagnetic materials polarized by a source of bias magnetic flux.

Additionally, the ferromagnetic material of acoustic resonator 200 may be a permanent magnetic material, which produces magnetic flux internally, and in which case pole pieces 300 and 301 are not necessary, the source of bias magnetic flux being internal to the material of resonator 200 rather than external to it.

FIG. 4 illustrates the wave mechanics outlined in FIG. 2: F1 in timeline detail, in further preparation for understanding a fundamental novelty of the disclosed invention.

Time instant T1 depicts acceleration source 201 at its peak acceleration in the rightward direction, indicated by the rightward arrow within the pictorial volume of acceleration source 201. This peak accelerating force propagates as a mechanical acoustic wave into acoustic resonator 200. The propagating momentum 400 is schematically depicted as a force accelerating toward the right hand side, by concentric hemicircles extending toward the right; while the propagation of this rightward force also toward the right is indicated by the diagram arrow pointing rightward. Two components exist: the direction of momentum in the acoustic wave (represented by the direction of the concentric circles, illustrating the wavefront) and, the direction of propagation of the momentum itself, indicated by the diagram arrow, representing the direction of wavefront travel. At time instant T1 the acoustic wave carrying rightward momentum propagates toward the right, its location at the left hand end of resonator 200.

At instant T2, a time equal to one quarter the resonant acoustic period (see FIG. 2: F1) has elapsed, and the emitted wavefront has propagated halfway down resonator 200. As this time instant is a quarter cycle after the peak rightward accelerative force of acceleration source 201, acceleration source at this instant one quarter-cycle later has reached zero, indicated by the dash line within the volume of acceleration source 201. While acceleration source 201 is at this time producing zero acceleration, the peak rightward-bearing acceleration has propagated as a wavefront along half the length of resonator 200.

Instant T3 illustrates conditions one further quarter-cycle later. Acceleration source 201 has now reached its peak leftward acceleration, denoted by the leftward arrow within the pictorial volume of 201. The resulting acoustic wave 410 is schematically represented by concentric hemicircles pointing leftward, while the direction of propagation of this energy is rightward, as indicated by the diagram arrow in the wavefront symbol at 410. At this same time, the original wavefront 400 has reached the end of resonator 200 and is reflected backward, taking the new designation 401 to reflect the change. As FIG. 1 illustrates, the reflection of this wave energy continues as a rightward momentum indicated by the direction of concentric hemicircles in wavefront symbol 401, but with the reversed direction of wavefront propagation, now indicated by a leftward arrow within wavefront symbol 401. Therefore, reflected original wavefront 401, produced at time instant T1, and subsequent wavefront 410, produced at time instant T3, are now propagating toward each other as time progresses.

At instant T4, wavefronts 401 and 410 have propagated toward one another and mutually approach at the center of resonator 200. The direction of wave propagation in each wavefront is opposite, causing their approach. As the wavefronts approach, the rightward momentum of T1's wavefront 401, on the right hand side, and the leftward momentum of T3's wavefront 410, on the left hand side, produce by their mutual action an elastic tensile stress at the center of resonator 200. This corresponds to the nodal point N+ in FIG. 2: F1, of which wavefront propagation diagram FIG. 4 is a more detailed model. In FIG. 1: F1, point N+, indicating the nodal region of maximal elastic stress corresponds to the center point of resonator 200 at FIG. 4: T4 where the wavefront energy produces the nodal point.

Instant T5 indicates wavefront activity one quarter cycle further in time. Acceleration source 201 has now reached its positive peak acceleration, as in instant T1, the difference between T1 and T5 being four units, representing four quarter-cycles, which are equal to one full cycle in time. At instant T5, leftward-propagating wavefront 401 has continued leftward, reaching the left end of resonator 200, and reflects at this end, the direction of wavefront propagation now becomes rightward. At this same instant T5, the peak rightward acceleration 201 strengthens the rightward momentum already present in wavefront 401 at the same location. The resulting wavefront of increased intensity takes the new designation 402, to reflect these changes: the reflection of the incoming wave energy 401 and an increase in total momentum carried by the wavefront due to further acceleration from acceleration source 201, in the same direction as the original momentum in prior wavefront 401. Meanwhile, wavefront 410 has reflected at the rightmost end of resonator 200, reversing direction of propagation, carrying the leftward momentum in this wavefront also leftward. The reversed direction of propagation of wavefront 410 is indicated by the successive designation of this wavefront 411, now in a leftward propagating direction.

Instant T6 is conceptually equivalent to time instant T4, the difference between T4 and T6 being two units, or two quarter cycles, equal to one half cycle. T6 represents the activity at T4 in the opposite polarity, producing a nodal point again at the center of resonator 200 and with the opposite, now compressive, elastic stress at this nodal point. This compressive stress is due to the rightward momentum in wavefront 402, approaching from left, with the leftward momentum of wavefront 411, approaching from the right. This produces a nodal point at the center of resonator 200 which is one-half cycle, or 180 degrees of the wave, later, thus being of opposite sign but equal intensity.

T7 illustrates the wavefront activity one quarter cycle subsequent to T6, where wavefront 411 has reflected at the left end of resonator 200 with further increase in intensity from the leftward acceleration of acceleration source 201, and taking successive designation as wavefront 412 to reflect the increase in total momentum of this wavefront, and the reversal of propagation direction due to reflection. Wavefront 402 has likewise reflected at the right hand end of resonator 200, its reversal in direction due to reflection giving it the successive designation 403. As the unit difference between T7 and T3 is also four units, or four quarter cycles equaling one full cycle or 360 degrees of the wave, the illustrated activity at T7 may be taken as equal to the action at instant T3 and progress further onward to T4, etc., progressing onward by quarter cycles to T7 and repeating indefinitely. The momentum of the two counter-propagating wavefronts 400+*n* and 410+*n* continues (where n represents successive continuation of the process illustrated), until the increasing momentum in each wavefront reaches equilibrium against practical acoustic losses and the finite accelerating force, or finite mechanical compliance, of a practical acceleration source 201.

FIG. 5 schematically illustrates a fundamental novelty of the disclosed invention, originally described above under "Summary of the Invention", section [B]: Magnetostrictive Positive Feedback. The schematic illustration of this activity in FIG. 5 may be taken as an extension of the wave mechanics described in FIG. 1: F1, as illustrated diagrammatically in FIG. 4.

FIG. 5: T1 begins at the same point illustrated in FIG. 4: T3, where original propagating wavefront 400 has reflected at the rightmost end of resonator 200 becoming wavefront 401 with reversed propagation direction, and where subsequent wavefront 410 has been established also. As in FIG. 4: T3, FIG. 5: T1 depicts the same instant where these two counter-propagating wavefronts are both present and propagating toward each other, to meet at the center of resonator 200.

As shown in FIG. 3, a bias magnetic flux is provided along the length of resonator 200 which is made of a ferromagnetic material having, for purposes of discussion, both a positive magnetoelasticicity, and positive magnetostriction, such as Metglas alloy 2605SA1 or 2605SC (Metglas Inc., Conway, S.C.). Since ferromagnetic resonator 200 material exhibits positive magnetoelasticity, compressive stress in the material produces a decrease in magnetic susceptibility while tensile stress produces an increase in magnetic susceptibility. Since ferromagnetic resonator 200 material exhibits positive magnetostriction, the material expands with increasing magnetic fields; increasing flux densities produce elongation of the material in the direction of the magnetic flux.

The magnetic bias shown in FIG. 3 is again present, due to flux sources or pole-pieces 300 and 301, but with the illustrative magnetic polarization lines omitted from the present diagram for clarity.

At instant T2A, acoustic wavefronts 401 and 410 have reached the center of resonator 200, producing a nodal point of tensile elastic stress. This tensile stress increases the magnetic susceptibility of the ferromagnetic material of resonator 200, causing the flux density at the nodal point to increase via magnetoelastically increased magnetic susceptibility. A single turn of conductive material, such as copper, is shown wrapped in a loop enclosing this nodal point. 500 and 501 indicate this conductive single turn, cut in cross section, where 500 indicates the upper portion of the loop and 501 indicates its lower portion in the viewing plane. The changing magnetic field creates an electric field 510 indicated by the diagram arrow between 500 and 501 in diagram T2A. Thus, the action of acoustic waves in ferromagnetic resonator 200 have resulted in the production of an electric field 510 in conductive loop 500-501 due to the bias magnetic flux within the ferromagnetic material being modulated by magnetoelastic sensitivity to stresses resulting from resonant acoustic waves.

When an electrical current 511 is allowed to flow through conductive loop 500-501, the direction of the electric current flows in a direction opposing and neutralizing the causative electric field indicated in diagram T2A, as depicted by the diagram arrow of current flow 511. A flow of electric current always generates a magnetic field. Since the current 511 flows in a direction which tends to neutralize the electric field 510 generated by the changing magnetic flux, the current flow 511 also generates a magnetic field which tends to oppose and neutralize the originally changing magnetic field, opposing its change. This activity is commonly referred to in the art as Lenz's Law.

The original change in magnetic field at instant T2A is an increase in magnetic flux due to tensile stress at the nodal point, increasing the magnetic susceptibility of the ferromagnetic material of resonator 200. Induced current flow 511 will act to oppose this increase in magnetic flux represented by induced electric field 510; therefore the magnetic field generated by the induced current 511 flowing within conductive loop 500-501 will attempt to create a field decreasing the total magnetic flux, at least partially canceling the original increase. This induced magnetic field also acts on the ferromagnetic material of resonator 200, which has positive magnetostriction. Since positive magnetostriction implies an elongation of the material with increasing flux density, the induced current is decreasing the flux density to restore equilibrium and therefore produces a contraction of, and thus a compressive reaction force within, the ferromagnetic material of resonator 200.

While the "A" in T2A stands for "action" at time T2, the "R" in T2R represents a depiction of the opposing reaction forces at this identical time instant T2. Whereas incoming acoustic wavefronts 401 and 410 create tensile stress at the nodal point in T4A, the new acoustic wavefronts 420 and 421 indicate the compressive reaction stress caused by magnetic induction acting on a magnetostrictive material in T2R.

Incoming acoustic wavefronts 401 and 410 in action diagram T2A contain diagram arrows indicating a mutually inbound propagation direction, where both wavefronts are converging at the nodal point at the center of resonator 200. Wavefronts 401 and 410 are approaching the central nodal point at instant T2A, having traveled inward from the ends of resonator 200.

In reaction diagram T2R, reaction wavefronts 420 and 421 share a mutual origin at the nodal point, where ferromagnetic magnetostriction has newly created these wavefronts due to magnetic induction, as Lenz's Law acting on a magnetostrictive material. Therefore the reaction wavefronts 420 and 421 each have propagation-direction arrows indicating outbound propagation from the nodal point at the center of resonator 200, toward respective ends of resonator 200.

Since reaction wavefronts 420 and 421 constitute acoustic pressure opposite to that of incoming acoustic wavefronts 401 and 410, the phase of the reaction wavefronts may be considered to be 180 degrees out of phase, or opposite of, the phase of the incoming wavefronts 401 and 410. The reaction wavefronts constitute additional acoustic energy which is 180 degrees out of phase with the original acoustic energy.

The nodal point where this reaction occurs is one-quarter acoustic wavelength distant from the acceleration source 201 driving the interaction. Thus, the phase of the wave activity at the nodal point is already shifted 90 degrees, or one-quarter cycle, behind the phase of the sinusoidally varying acceleration of source 201. The wave energy at the nodal point lags by 90 degrees of a cycle, and the reaction wavefronts produced by current flow in conductive coil 500-501 constitute an additional 180 degree phase shift, since the reaction wavefronts constitute opposition to incoming wavefronts. Therefore, the net phase of the reaction wavefronts emerging from the nodal point lags a total of 270 degrees, or three-quarters of a cycle, behind the phase of acceleration source 201. It should be remembered that the wavefronts in this description are not single events, but indicate the peaks of a sinusoidal wave in all cases.

Reaction wavefront 421 propagates leftward after its creation, toward acceleration source 201, over a distance equal to one-quarter the acoustic wavelength. Due to the finite acoustic propagation velocity, reaction wavefront 421 is delayed a further 90 degrees, or one-quarter cycle, by the time it reaches the leftmost end of resonator 200 and attached acceleration source 201. Upon arrival, the additional 90 degree phase shift adds to the previous shift, or cycle delay, of 270 degrees, producing a total phase shift of 360 degrees, or one full cycle, which is mathematically equal to a phase shift of 0 degrees, or no phase shift at all.

Therefore, reaction wavefront 421 arrives at the acceleration source 201 with a phase that is identical to the phase of the acceleration source 201. Whereas a 180 degree phase shift would constitute opposition of the acceleration, or destructive wave interference, a 360 degree or 0 degree phase shift constitutes addition to the acceleration, or constructive wave interference. Although destructive wave interference occurs at the nodal point due to the nature of magnetic opposition expressed in Lenz's Law, having translated to mechanical opposition via the properties of magnetoelasticity and magnetostriction, the additional phase delay of 90 degrees for acoustic wavefronts incoming and outbound from the nodal region constitutes an additional total phase shift of 180 degrees, the sum being 360 degrees, one full cycle, therefore zero phase difference between action and reaction at the site of acceleration source 201. The in-phase nature of action and reaction constitute constructive wave interference and addition of forces, rather than destructive wave interference or opposition of forces.

Therefore, when current is allowed to flow through conductive single turn 500-501, additional wavefront energy is ultimately present at acceleration source 201, aiding the acceleration and longitudinal displacement at the leftmost end of resonator 200 where acceleration source 201 is located. Since the accelerating force is now being aided, or has a secondary wavefront present which is in-phase with the phase of the acceleration itself, the resonant wave in resonator 200 may be maintained with less acceleration input from source 201 than was necessary before current was allowed to flow in conductive loop 500-501.

In practice, conductive loop 500-501 will have many turns of conductive metal wire, such as copper wire, functioning as a generator coil supplying electrical energy to a device requiring a power source. To the extent which electrical current flows in this closed circuit, acceleration source 201 will be aided by the actions described above, thereby requiring less energy to produce said acceleration as a source, since some of the accelerating activity is now self-produced by the inventive process hereby disclosed.

At this same instant T3, complimentary reaction wavefront 420 has propagated to the rightmost end of resonator 200, reflecting at this rightmost end with successive designation 430 indicating the reflection.

A further quarter-cycle later, at instant T4A, the conditions described above for instant T2A are again present, but with reversed momentum. At instant T4A, the incoming acoustic energy produces compressive stress at the nodal point. The resonator material defined in this illustration has positive magnetoelasticity, such that compressive stress causes a decrease in magnetic susceptibility, thereby causing a decrease in total magnetic bias polarization, or a decreasing magnetic flux.

The reaction T4R indicates the opposition to this set of conditions. The decreasing magnetic flux in T4A is opposed by magnetic induction, or current flow in conductive turn 500-501, causing a secondary magnetic field which opposes the change in magnetic flux, or a secondary induced magnetic flux which tends to cause an increase in total magnetic flux, by attempting to oppose the magnetoelastically generated decrease. The action of attempting to increase the total magnetic flux will elongate the ferromagnetic material of resonator 200, since the magnetostriction is positive. This elongation is indicated by the reaction wavefronts 440 and 441, whose outward-going momentum is consistent with elongation of the material.

As illustrated beforehand by time instant T3, the time instant T5 which is one-quarter cycle subsequent to instants T4, depicts propagation of reaction wavefront 440 back toward acceleration source 201, again with an additional 90 degree or quarter-cycle delay due to the finite acoustic propagation velocity during this time. At instant T5, the leftward momentum of wavefront 440 has reached acceleration source 201 which is now in its peak of leftward acceleration; the two accelerations once again assist each other mutually. The reflection of this acoustic wavefront at the leftward boundary of resonator 200 reverses the propagation direction of wavefront 440 causing the wavefront to take the successive designation 450 in diagram T5.

Meanwhile at time instant T5, complimentary reaction acoustic wavefront, generated by magnetostrictive activity, has reached the rightmost end of resonator 200 and reflects, reversing propagation direction, and taking the successive designation 451. Time instant T5 is effectively identical to time instant T1, as the difference between T1 and T5 is 4 units, or 4 quarter-cycles, or a full cycle. The cycle thus repeats with T1 being equal to T5, and so on.

Each time a nodal point is created, at instants T2 or T4, reaction forces are produced which create reaction acoustic wavefronts in the magnetostrictive material of resonator 200. Owing to the finite propagation velocity of the acoustic energy, the arrival of all such reaction wavefronts at acceleration source 201 consistently results in wave energy that is substantially in-phase with the acceleration source itself, effectively providing an independent source of mechanical acceleration or acoustic wave energy identical to that produced by acceleration source 201 which provides such energy by external means. When conductive turn 500-501 is allowed to support a current flow in a closed circuit, this second source of acoustic energy is caused to exist.

This self-reinforcing magneto-acoustic wave interaction is strongly dependent on the phase of the electrical current allowed to flow through conductive turn, or turns 500-501. The phase of electrical current flow may be adjusted by connecting a capacitor in series or in parallel with conductive turn(s) 500-501, producing capacitive reactive impedance which cancels or offsets the inductive impedance of conductive turn or turns 500-501. By use of appropriate tuning, where necessary, the phase of induced electrical current may be adjusted to produce the constructive interference of acoustic energy described above.

This constructive wave interference is also dependent on the magnetoelastic properties of the magnetic material constituting resonator 200. In the above description, both magnetoelasticity and magnetostriction are positive in sign. Certain elements such as Nickel, or alloys such as samarium ferrite (SmFe2) exhibit negative magnetostriction but also exhibit negative magnetoelasticity. In either case, the sign of magnetoelastic and magnetostrictive action are identical, and the wave interaction described above will continue to occur. If the sign of magnetoelastic and magnetostrictive properties were opposite, the above interaction could not occur, but materials having oppositely signed magnetostriction and magnetoelasticity are not presently thought to exist.

The above illustration concerns operation at the fundamental resonant frequency F1 described and depicted in FIG. 2. It may be understood the same overall reaction continues to manifest at higher harmonic overtones, although illustration and description of this activity becomes increasingly complex. The essential mechanics of such interaction are given by the above discussion, and apply to operation at higher harmonic overtones shown in FIG. 2.

FIG. 6 illustrates an additional benefit gained by operating the disclosed invention at F2, the second harmonic overtone, or twice the fundamental resonant frequency. The conditions illustrated in FIG. 5 continue to apply, such that the acoustic wave interference may become constructively self-reinforcing. FIG. 6 constitutes an illustration of the summary description given above in "Summary of the Invention", section [A]: Lenz Field Addition.

As shown in FIG. 2: F2, operation at a second harmonic overtone creates dual nodal points in resonator 200, both of which are spaced one-quarter acoustic wavelength from respective ends of resonator 200, while being one-half acoustic wavelength distant from each other, within the resonator. The polarity of elastic stress at each nodal point is opposite the other: while nodal point N+ in FIG. 2: F2 may be at a particular instant produce compressive stress, the opposite nodal point N− will exhibit a complimentarily tensile stress.

In a material having positive magnetoelasticity and a bias flux from flux sources or pole pieces 300 and 301, these dual nodal points cause opposing changes in magnetic flux density at their respective locations. Nodal point N+ may produce compressive stress, reducing the total flux density local to this node, while complimentary nodal point N− will, at the same time produce tensile stress, increasing the total flux density local to this complimentary, opposing node. It may be recognized the same opposition will occur in ferromagnetic materials having negative magnetoelasticity, although the relationship between the sign of stress and the sign of flux density change will reverse.

Since the two nodal points produce opposing changes in the magnetic flux local to each node, magnetically induced electric fields 510 and 512 will likewise oppose. Since there are two nodal points, two conductive turns 500-501 and 502-503 are provided, again shown in cross section, each carrying diagrammatical arrows indicating the opposing current flow within either conductive turn.

Since the secondary reaction magnetic field produced by current flow in a conductive turn has a magnetic polarity determined by the direction of current flow, the reaction magnetic field from each conductive turn, 500-501 and 502-503, oppose and mutually annihilate, over the length of ferromagnetic resonator 200. The material of resonator 200 immediately within the bore of the conductive turns continues to respond to the flux produced by the conductive turn wrapped around its immediate vicinity. If such material has magnetostriction equal to the sign of its magnetoelasticity, the constructive wave interference depicted in FIG. 5 remains present.

The electrical power available from the disclosed invention may be limited by the inductive reactance of conductive turns, particularly when the turns are multiple, as in a generator in accordance with the invention being reduced to practice, or designed to generate high voltages necessitating many conductive turns wound in place of a single turn. The resulting electrical inductance can upset the phase relationships necessary to produce constructive wave interference, as well as limiting the total current deliverable by the conductive turns, to an electrical load.

When two or more conductive turns are wound around opposing nodal points, the opposing currents in each tend to cancel the inductive reactance of each conductive turn and their total inductive reactance within the generator as a whole. The cancellation of inductive reactance results in a greater power available from the disclosed invention.

Furthermore, the mutually opposing current flows may be recognized as identical to those which occur in a single-phase power transformer of conventional design, where current in a secondary coil that is powering an electrical load opposes the direction of, and thereby increases the current flow within, the primary coil initiating the magnetic activity of the transformer. Each mutually opposing current flow 511 and 513, depicted in FIG. 6 acts as a transformer primary to the opposite conductive turn, causing the total electrical power generated in each conductive turn to increase when both turns are conducting induced currents. By this mechanism, an electrical load drawing an increasing amount of electrical energy from induced current flow in conductive turn 500-501, for example, causes an automatic increase in the electrical power delivered simultaneously by conductive turn 502-503. This mutually-reinforcing magnetic interaction, due to the destructive interference of Lenz's Law magnetic opposition, is produced additionally to the mutually reinforcing acoustic wave interference previously described in the sections above, further increasing the electrical power generated by the invention disclosed.

The mechanism by which this occurs is illustrated by long diagram arrows 313 and 323 which represent the direction of reaction magnetic flux from each conductive turn, conducting the induced electrical current. The opposing current flows create magnetic fields which also oppose, as shown by the opposite directions of magnetic field vector arrows 313 and 323. These fields tend to annihilate to zero net magnetic flux at location 330, neutralizing any net magnetic reaction flux along the total length of resonator 200, thereby reducing the parasitic inductive reactance to small value. The reaction magnetic field 313, for example due to current flow in conductive turn 500-501, acts as a generator field to the conductive turn 502-503, while the reaction magnetic field 323 due to current flow in conductive turn 502-503 acts as a magnetic field generating additional electric current in conductive turn 500-501. The reaction magnetic field in each conductive turn causes a generating action in the other conductive turn.

The wave interaction simultaneously utilizing more than one harmonic overtone, described at "Summary of the Invention", section [C]: Harmonic Addition, may be applied to the interactions illustrated in either FIG. 5 or FIG. 6. Whereas the illustrations as shown rely on a single frequency and single set of nodal stress points, for the sake of a simple illustration, a combination of harmonic overtone frequencies may also be used, which result in nodal points superimposed at the various locations shown in FIG. 2 for each harmonic overtone that is simultaneously present. By such means the total electrical power generated by the disclosed invention may be substantially increased. This method requires that the energy in each overtone produce constructive wave interference or simultaneous addition of wave peaks, at each nodal point rather than subtraction of peaks as is typical of destructive wave interference. Constructive harmonic interference is achieved when the phase of each overtone frequency is aligned such that the peaks of each harmonic wave simultaneously coincide with the like-sign peaks of all other harmonics simultaneously present in the expanded series.

For purposes of example, the single-node fundamental resonance utilized in FIG. 4 or FIG. 5 may be expanded to a harmonic series including harmonic overtones 1, 3, 5, and odd higher integers as is practical; it will be seen that the combination of odd overtones in this case results in a central node as the sum of all overtones, with the addition of minor nodal points at positions to the right and left of center. This view is created by superimposing the nodal structures of F1, F3, and F5 of FIG. 2 in a single common resonator 200, depicting the wave structure that results when these harmonics are simultaneously present. When the relative phase of each harmonic is appropriately aligned, wave peaks of all harmonic overtones will occur synchronously with the lowest harmonic overtone, causing addition of the total wave energy present at the peaks of the lowest overtone, creating a substantial increase of available generated electricity as described in the Summary section [C], above.

In a likewise manner, the dual node topology shown by FIG. 6 may be harmonically expanded to include overtone frequency multiples 2, 4, 6, and higher even-order integer multiples as is practical; it will be seen the combination of even overtones by superposition results in two major nodes, whose position is defined by the lowest harmonic overtone, and which contain energy across the entire harmonic series. Minor nodal points may exist which do not include the total harmonic energy; these minor nodes may also be enclosed by conductive turns in order to contribute to the total output of the disclosed invention as a generator, or provide additional electrical outputs. Such minor nodes may also be left free without negatively impacting operation of the invention. There is no theoretical limit on this expansion of the harmonic series, which may include very high order overtones that are substantial multiples of the fundamental resonant frequency. In practice, extremely high frequency overtones are often undesirable as they contribute successively less energy to the generated electrical output, and the extent of the harmonic series to be used in practice is determined by the point of diminishing returns.

DETAILED DESCRIPTION OF AN EMBODIMENT

Figure 7:
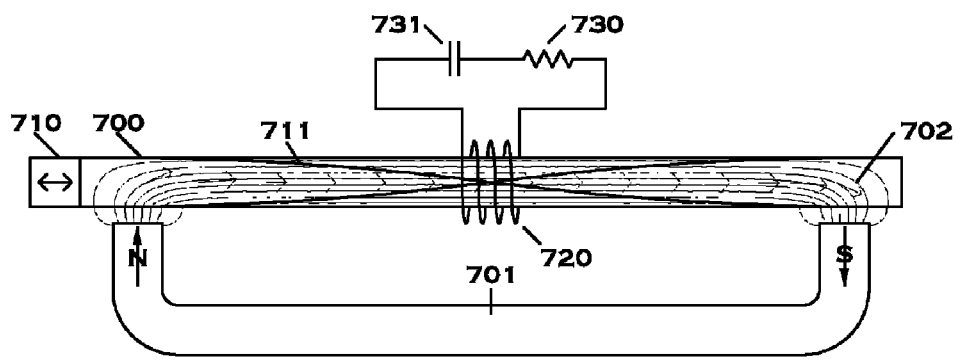
FIG. 7 is a detailed illustration of the present invention.

FIG. 7 shows an embodiment designed to harvest power from a source 710 of vibratory energy. Ferrite rod 700 is coupled to the vibratory energy source 710 at one end, the other end being unconstrained except for support. The length of the rod is trimmed to resonate at the vibratory frequency or a harmonic multiple thereof; alternately, the driven frequency of vibratory energy source 710 is adjusted to match the resonant frequency of the rod 700. If resonating at the fundamental frequency, a standing pressure wave will develop within the rod, creating a node, or maximum of pressure at the center. If resonance is at a harmonic multiple of the fundamental frequency, two or more nodal points will develop having maximum pressure.

Bridging this nodal point is a permanent magnet or array of magnets 701, shown here for clarity as a single U-shaped magnet having North and South poles. Lines of magnetic flux 702 are shown completing the magnetic circuit axially through ferrite rod 700. An electrical conductor, such as the coil of wire 720, is wound around the core centered at the nodal point and connected to electrical load 730, shown here as a resistor.

Through magnetoelastic action the magnetic flux in the rod is modulated by the pressure variation and results in an induced current in coil 720 through Faraday's Law. The resulting EMF at the coil terminals is converted to current through load resistor 730 according to Ohm's Law and results in the delivery of power in the form of heat. Resistor 730 may be replaced with any electronic or electric circuit, including rectifiers, power converters, and voltage regulators.

Coil 720 must be sized so that its inductance, together with the load resistance, does not present excessive electrical impedance to the induced power at the vibratory frequency. The inductance of the coil may be compensated for by a capacitance 731 sufficient to resonate the coil at the vibratory frequency. The strength of the magnetic field must be adjusted to produce maximum response through the magnetoelastic effect.

Figure 8:
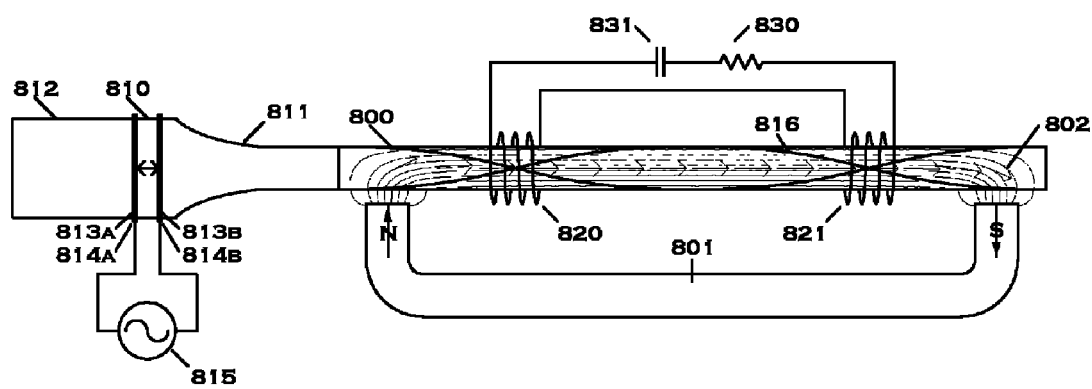
FIG. 8 is a detailed illustration of the present invention incorporating a piezoelectric element as the source of acoustic energy.

FIG. 8 shows the magnetoelastic generator of FIG. 7 resonating at the second harmonic of the fundamental longitudinal resonant frequency, thereby producing two nodal points having opposing acoustic pressure. The rod is coupled to a piezoelectric element 810 capable of developing pressure at its faces 813a and 813b under control of an alternating electric field between electrode plates 814a and 814b, driven from external oscillator and driver circuit 815. Acoustic horn 811 is trimmed to one quarter the vibratory wavelength and produces maximum displacement at the vibratory frequency at the driven end of the rod 800, in response to the alternating pressure developed by piezoelectric element 810. Piezoelectric element 810 is terminated with a back mass 812 whose density and acoustic length have been chosen to develop maximal longitudinal displacement at the junction between horn 811 and rod 800 while maximizing electrical efficiency of piezoelectric element 810 at the operating frequency.

Ferrite rod 800 is driven to acoustic resonance at the second harmonic of its fundamental resonant frequency by acoustic horn 811, resulting in acoustic wave 816 within the rod having two nodal points. Each nodal point exhibits instantaneous acoustic pressure opposite the other nodal point. Bias magnet 801 produces magnetic flux 802 extending axially through both nodal points developed within rod 800. Since both nodal points within the rod develop oppositely signed instantaneous acoustic pressure, the electromotive force developed via the magnetoelastic effect at each nodal point is oppositely directed. Coils 820 and 821 are wound oppositely and connected in electrical series, such that their developed electromotive forces add. The sum electromotive force of coils 820 and 821 develops electrical current and power in resistive load 830. The reactive impedance of coils 820 and 821 is reduced by their mutually opposite inductive polarities, and is further corrected to unity power factor by capacitor 831, such that maximum electrical power is developed across resistive load 830.

What is claimed is:
1. An apparatus for generating electrical power, comprising:
    at least one section of magnetically polarizable material,
    a source of mechanical vibration acoustically coupled to the magnetically polarizable material being capable of producing acoustic excitation within the magnetically polarizable material,
    at least one source of magneto-motive force coupled to the magnetically polarizable material being capable of producing magnetic polarization of the magnetically polarizable material,
    one or more electrical conductors encircling the magnetically polarizable material, each comprise a plurality of conductive elements inductively coupled to the magnetically polarizable material wherein each separate inductive element is separated from the next by a distance not less than ⅛ the acoustical wavelength of the lowest-order resonant mode of the acoustic oscillation in the apparatus, for purposes of extracting electrical energy and providing an electrical power output,
    a physical separation between the source of mechanical vibration and the nearest electrical conductor corresponding to a distance not less than ⅛ the acoustical wavelength of the lowest-order resonant mode of acoustic oscillation in the apparatus; and an electrical load, being in direct electrical communication with the electrical power output, having a nonlinear time-changing resistance, by including semiconductor switching elements for purposes of periodically modulating the current.

2. The apparatus according to claim 1, wherein the electrical conductors are wires.

3. The apparatus according to claim 1, wherein the electrical conductors are wire coils.

4. The apparatus according to claim 1, wherein the magnetically polarizable material exhibits nonzero magneto-elastic coupling properties.

5. The apparatus according to claim 1, wherein the magnetically polarizable material exhibits nonzero magnetostrictive coupling properties.

6. The apparatus according to claim 1, wherein the magnetically polarizable material is a ferromagnetic amorphous alloy.

7. The apparatus according to claim 6, wherein the ferromagnetic amorphous alloy is an alloy type selected from the group consisting of 2605SA1 and 2605SC.

8. The apparatus according to claim 1, wherein the magnetically polarizable material is formed from a low-coercive force ferromagnetic material selected from the group consisting of Manganese Ferrite, Zinc Ferrite, Nickel Ferrite, Hematite, Samarium Ferrite, Cobalt Ferrite, Lithium Ferrite, Aluminum Ferrite, and Lanthanum Ferrite.

9. The apparatus according to claim 1, wherein the magnetically polarizable material is formed from a high-coercive force ferromagnetic material selected from the group consisting of Barium Ferrite, Calcium Ferrite, Strontium Ferrite, and Lead Ferrite.

10. The apparatus according to claim 1, wherein the magnetically polarizable material is formed from metals selected from the group consisting of Iron, Aluminum, and Gallium.

11. The apparatus according to claim 1, wherein the magnetically polarizable material is formed from an iron-containing polycrystalline alloy, said alloy incorporating elements selected from the group consisting of transition elements and lanthanide elements.

12. The apparatus according to claim 1, wherein the source of mechanical vibration is formed from a piezoelectric ceramic mechanically coupled to the magnetically polarizable material.

13. The apparatus according to claim 12, wherein the source of mechanical vibration has acoustic wave sections and displacement multipliers forming an acoustic resonator structure.

14. The apparatus according to claim 1, wherein the source of mechanical vibration is an electromagnetic vibrating actuator proximate to the magnetically polarizable material and imparting mechanical vibration to the magnetically polarizable material.

15. The apparatus according to claim 1, wherein the originating source of mechanical vibration is self-contained in the magnetically polarizable material, said vibration being produced by the action of time-varying magnetic flux on the magnetostrictive properties of the magnetically polarizable material.

16. The apparatus set forth according to claim 1, wherein the conductive elements are constructed of insulated metal strip.

17. The apparatus set forth according to claim 16, wherein the insulated metal strip is insulated copper foil.

18. The apparatus according to claim 1, wherein the electrical load further comprises a passive electrical reactance element as a means of neutralizing the inductive reactance of the conductive circuit paths.

* * * * *